United States Patent
Ford et al.

(10) Patent No.: US 10,436,612 B2
(45) Date of Patent: Oct. 8, 2019

(54) ENCAPSULATED SOFT-LEAD CAPACITANCE PROBE FOR A GAS TURBINE ENGINE

(71) Applicant: UNITED TECHNOLOGIES CORPORATION, Farmington, CT (US)

(72) Inventors: Kevin Ford, Middletown, CT (US); Eli Warren, Wethersfield, CT (US); Corey A. Benoit, Uncasville, CT (US); Edward F Dreger, Burlington, CT (US); Erik D. Rice, Lebanon, CT (US); Mark W. Costa, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1029 days.

(21) Appl. No.: 14/919,225

(22) Filed: Oct. 21, 2015

(65) Prior Publication Data
US 2016/0195411 A1   Jul. 7, 2016

Related U.S. Application Data

(60) Provisional application No. 62/076,289, filed on Nov. 6, 2014.

(51) Int. Cl.
*G01D 5/241* (2006.01)
*G01B 7/14* (2006.01)
(Continued)

(52) U.S. Cl.
CPC .............. *G01D 5/2417* (2013.01); *F01D 5/02* (2013.01); *F01D 17/02* (2013.01); *F01D 21/003* (2013.01);
(Continued)

(58) Field of Classification Search
CPC ....... G01D 5/2417; G01M 15/14; G01B 7/14; F01D 21/003; F01D 25/24; F01D 17/02; F04D 29/321; F04D 29/325
See application file for complete search history.

(56) References Cited

U.S. PATENT DOCUMENTS 2,842,738 A   7/1958 Warnick
4,888,948 A * 12/1989 Fisher .................... G01N 27/60
                                                        324/454
(Continued)

FOREIGN PATENT DOCUMENTS

| CN | 103673863 A | 3/2014 |
| EP | 0246576 A1 | 11/1987 |
| EP | 2505779 A2 | 10/2012 |

OTHER PUBLICATIONS

English Abstract for CN103673863A—Mar. 26, 2014; 2 pgs.
(Continued)

*Primary Examiner* — Jason D Shanske
*Assistant Examiner* — Maxime M Adjagbe
(74) *Attorney, Agent, or Firm* — Cantor Colburn LLP

(57) ABSTRACT

A capacitance probe monitors the distance between a blade tip and a fan, compressor or turbine case. The capacitance probe may be attached to a liner, and may travel with the liner as it radially expands due to thermal changes. The capacitance probe may include a circuit board sensor with a metallic plate, and one or more capacitors. The metallic plate may be encapsulated within an insulating material. A plurality of soft leads may be in electrical communication with the circuit board sensor, allowing a lower lead weight, reduced size and increased flexibility. The soft leads may also be embedded in the liner. In this way, the capacitance probe can record more accurate distance measurements and promote a gas turbine engine's continued and efficient operation.

15 Claims, 7 Drawing Sheets

(51) Int. Cl.
    *F01D 17/02*    (2006.01)
    *F01D 5/02*     (2006.01)
    *F01D 21/00*    (2006.01)
    *F01D 25/24*    (2006.01)
    *F04D 29/32*    (2006.01)
    *G01M 15/14*    (2006.01)
    *F01D 11/20*    (2006.01)

(52) U.S. Cl.
    CPC ........... *F01D 25/24* (2013.01); *F04D 29/321* (2013.01); *F04D 29/325* (2013.01); *G01B 7/14* (2013.01); *G01M 15/14* (2013.01); *F01D 11/20* (2013.01); *F05D 2220/32* (2013.01); *F05D 2260/83* (2013.01); *Y02T 50/672* (2013.01)

(56) References Cited

U.S. PATENT DOCUMENTS

| | | |
|---|---|---|
| 5,140,494 A | 8/1992 | Slade |
| 5,166,626 A | 11/1992 | Hester et al. |
| 5,973,502 A | 10/1999 | Bailleul et al. |
| 2009/0128166 A1 | 5/2009 | Webster |

OTHER PUBLICATIONS

English Abstract for EP0246576A1—Nov. 25, 1987; 2 pgs.
European Search Report for Application No. 15193505.3-1568; dated Apr. 4, 2016; 8 pgs.

\* cited by examiner

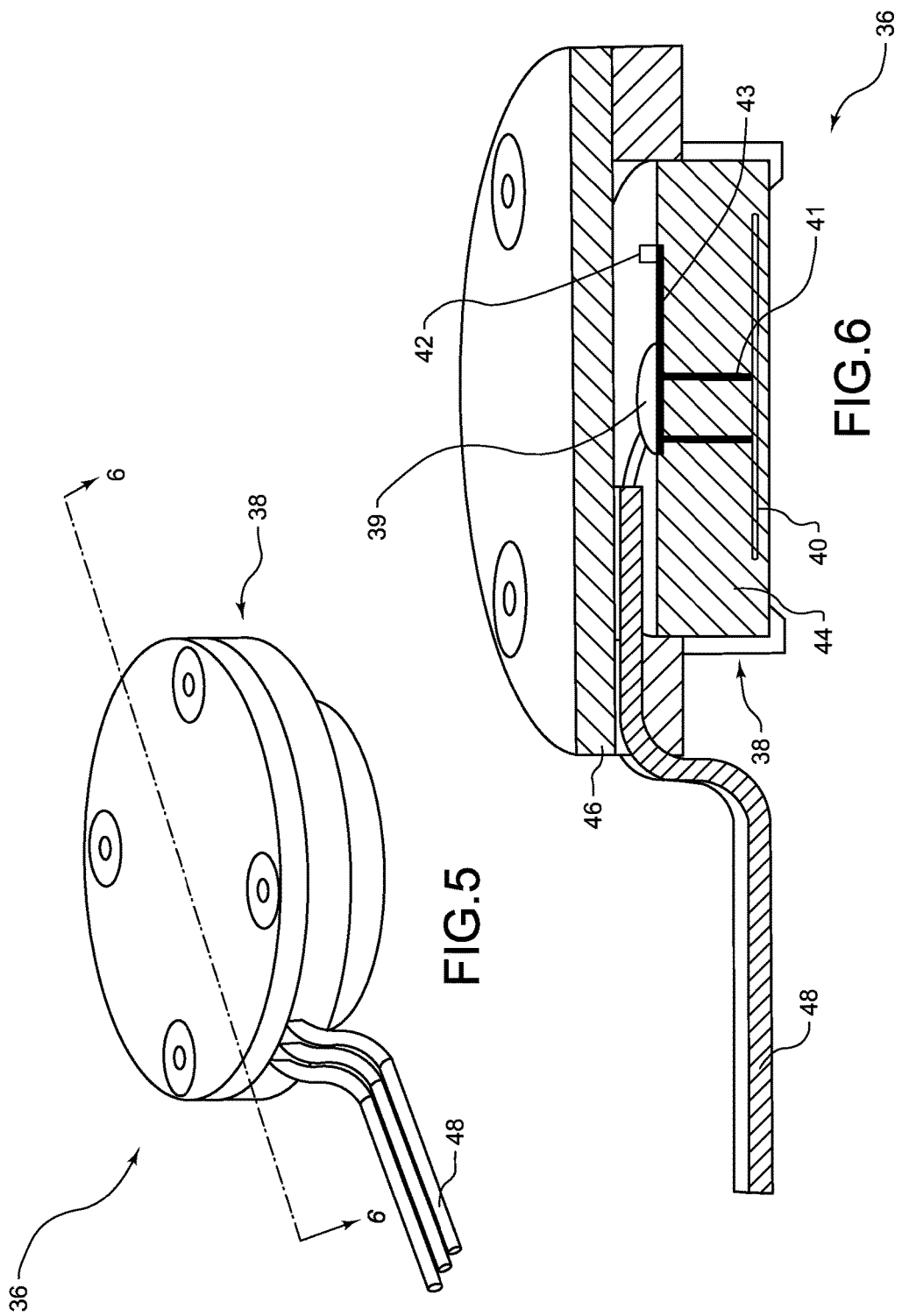

ENCAPSULATED SOFT-LEAD CAPACITANCE PROBE FOR A GAS TURBINE ENGINE

CROSS REFERENCE TO RELATED APPLICATIONS

This application is a non-provisional application claiming the 35 USC § 119(e) benefit of U.S. Provisional Patent Application No. 62/076,289 filed on Nov. 6, 2014.

FEDERAL RESEARCH STATEMENT

This invention was made with government support under contract DTFAWA-10-C-00041 awarded by NASA. Therefore the government has certain rights in this invention.

TECHNICAL FIELD

This disclosure generally relates to gas turbine engines. In particular, this disclosure relates to a system for measuring blade tip clearances relative to a fan case.

BACKGROUND

Many modern aircraft, as well as other vehicles and industrial processes, employ gas turbine engines for generating energy and propulsion. Such engines include a fan, compressor, combustor and turbine provided in serial fashion, forming an engine core and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via an internal shaft. Energy from the combustion gases not used by the turbine is discharged through an exhaust nozzle, producing thrust to power the aircraft.

Gas turbine engines contain an engine core and fan surrounded by a fan case, forming part of a nacelle. The nacelle is a housing that contains the engine. The fan is positioned forward of the engine core and within the fan case. The engine core is surrounded by an engine core cowl and the area between the nacelle and the engine core cowl is functionally defined as a fan duct. The fan duct is substantially annular in shape to accommodate the airflow from the fan and around the engine core cowl. The airflow through the fan duct, known as bypass air, travels the length of the fan duct and exits at the aft end of the fan duct at an exhaust nozzle.

In addition to thrust generated by combustion gasses, the fan of gas turbine engines also produces thrust by accelerating and discharging ambient air through the exhaust nozzle. Various parts of the gas turbine engine generate heat while operating, including the compressor, combustor, turbine, central rotating shaft and fan. To maintain proper operational temperatures, excess heat is often removed from the engine via oil coolant loops, including air/oil or fuel/oil heat exchangers, and dumped into the bypass airflow for removal from the system.

The fan includes a number of blades arranged radially from the central longitudinal axis. The blades rotate about the central longitudinal axis when in operation. Each blade has a tip located at the blade's extreme end, distal to the central longitudinal axis. As the fan rotates, each blade will pass at a distance from a point along the fan case. Certain distances, or tolerance levels, are desirable for different gas turbine engine performance characteristics. If such a tolerance level is not achieved, conditions adverse to gas turbine engine efficiency may result, including increased turbulence, internal drag or flow around the fan rather than through the fan.

Accordingly, it is important to accurately monitor the distance between the tip and the fan case to maintain tolerances. As a gas turbine engine operates, certain parts may expand due to the heat generated and absorbed. These may include fan blades, the fan case or a liner. The liner may be a part of the fan case or an independent part, and may expand along with the blades. In this manner, a desired tolerance level may be maintained. However, if a sensor for monitoring the distance between the tip and the fan case is not allowed to compensate for thermal expansion, measurement accuracy may suffer. Further, if a sensor is designed with hard leads or a prohibitive size or weight, accurate measurement may also be hindered.

Accordingly, there is a need for an improved system for monitoring tip clearance.

SUMMARY OF THE DISCLOSURE

To meet the needs described above and others, the present disclosure provides a gap measuring assembly, which may include a rotating member, an expandable member relative to the rotating member and defining a gap therebetween, a circuit board sensor mounted to the expandable member, the circuit board sensor including a metallic plate disposed within an insulating material and a housing, and a soft lead extending from the housing and being embedded in the expandable member.

The circuit board sensor may include one or more capacitors.

The circuit board sensor may be in electronic communication with the soft lead.

The rotating member may be a blade.

The expandable member may be a thermally conforming liner.

The thermally conforming liner may be able to expand in response to thermal or mechanical changes.

The insulating material may be a polymer.

The insulating material may be a ceramic.

The housing may be made from an electrically conductive material.

The gap measuring assembly may be able to sense a distance at which a blade passes relative to the liner.

The present disclosure also provides a gas turbine engine, which may include a fan located at the axially forward end of the gas turbine engine and axially forward of a compressor, the compressor located axially forward of a turbine, the turbine mechanically connected to the fan and the compressor, a capacitance probe including a circuit board sensor having a metallic plate disposed within an insulating material, the circuit board sensor disposed within a housing, the capacitance probe, circuit board sensor and housing adapted to monitor a tolerance of the gas turbine engine.

The circuit board sensor may include one or more capacitors.

The circuit board sensor may be in electronic communication with one or more soft leads.

A liner may be positioned proximate to the fan, wherein the one or more soft leads are embedded in the liner.

The capacitance probe may be attached to the liner.

The insulating material may be a polymer.

The insulating material may be a ceramic.

The housing may be made from an electrically conductive material.

The present disclosure further provides a method for measuring tip clearance relative to a static structure of a gas turbine engine that may include attaching a capacitance probe to a liner, the capacitance probe including a circuit board sensor having a metallic plate disposed within an insulating material, the capacitance probe disposed within a housing, the capacitance probe able to sense a distance at which a blade tip passes, rotating a fan about a central longitudinal axis, the fan having a plurality of blades, each blade having a tip, and sensing a minimum distance between the tip and the capacitance probe when the tip travels past the sensor.

The circuit board sensor may further include one or more capacitors, and the circuit board sensor may be in electronic communication with one or more soft leads.

These and other aspects and features of the present disclosure will be more readily understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which:

FIG. 5 is a perspective view of a capacitance probe constructed in accordance with the present disclosure.

FIG. 6 is a perspective side view of the capacitance probe of FIG. 5 and sectioned along line 6-6 of FIG. 5.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
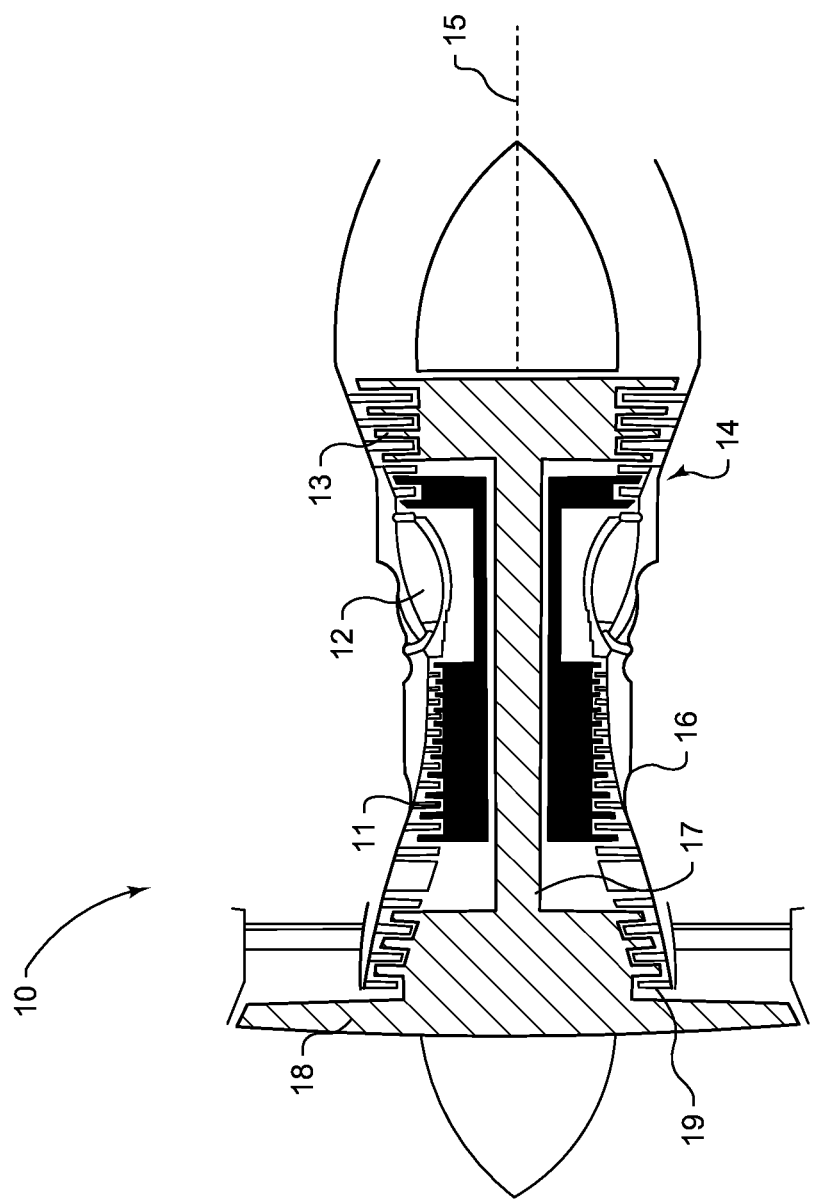
FIG. 1 is a sectional view of a gas turbine engine constructed in accordance with the present disclosure.

Turning now to the drawings, and with specific reference to FIG. 1, a gas turbine engine constructed in accordance with the present disclosure is generally referenced to by reference numeral 10. The gas turbine engine 10 includes a compressor 11, combustor 12 and turbine 13, known as the engine core 14, lying along a central longitudinal axis 15, and surrounded by an engine core cowl 16. The compressor 11 is connected to the turbine 13 via a central rotating shaft 17. Additionally, in a typical multi-spool design, plural turbine 13 sections are connected to, and drive, corresponding plural sections of the compressor 11 and a fan 18 by way of central rotating shaft 17, enabling increased compression efficiency. The fan 18 is located at the axially forward end of the gas turbine engine 10, and axially forward of the compressor 11. The compressor 11 is located axially forward of the turbine 13.

As is well known in the art, ambient air enters the compressor 11 at an inlet 19, is pressurized, and is then directed to the combustor 12, mixed with fuel and combusted. This generates combustion gases that flow downstream to the turbine 13, which extracts kinetic energy from the exhausted combustion gases. The turbine 13, via central rotating shaft 17, rotatingly drives the compressor 11 and the fan 18, which draws in ambient air.

Figure 2:
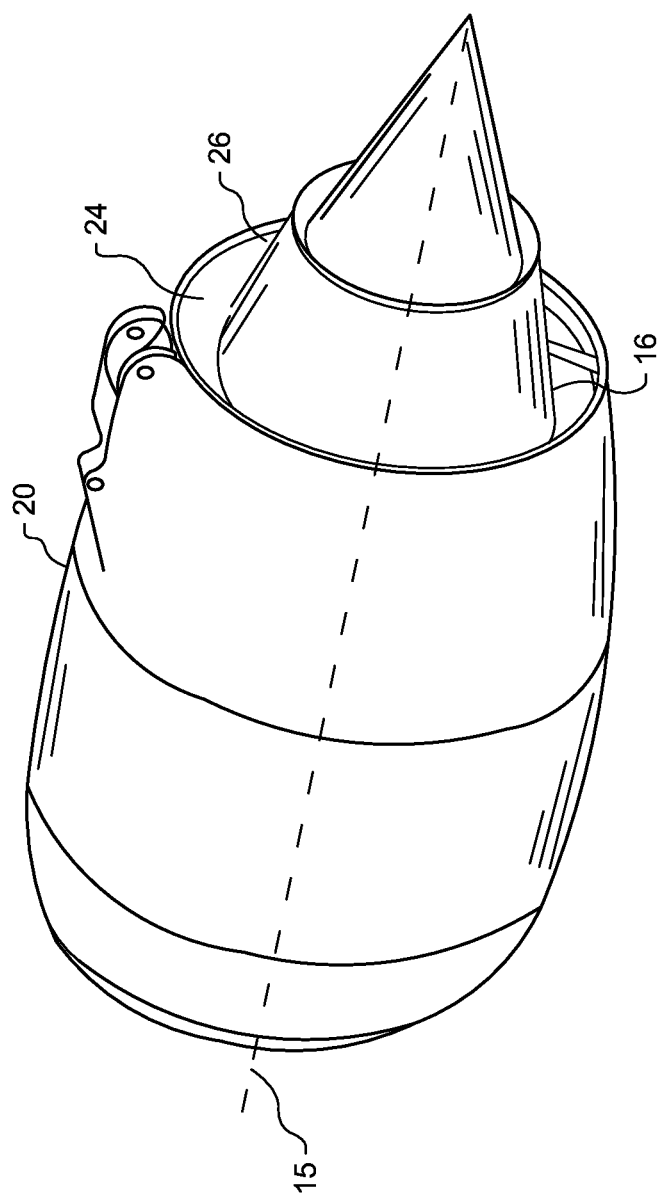
FIG. 2 is a rear perspective view of a gas turbine engine constructed in accordance with the present disclosure.

A nacelle 20 is a substantially cylindrical housing around the gas turbine engine 10. As best understood through FIG. 2 in conjunction with FIG. 3, the interior surface of the nacelle 20 consists of a fan cowl 22, which surrounds the fan 18 and engine core cowl 16. A fan duct 24 is functionally defined by the axially extending area between the engine core cowl 16 and the fan cowl 22. The fan duct 24 is substantially annular in shape to accommodate the airflow produced by the fan 18. This airflow travels the length of the fan duct 24 and exits downstream at a fan nozzle 26. The fan nozzle 26 is located at the downstream exit of the fan duct 24, as shown in FIG. 2. The fan 18, engine core 14 and nacelle 20 may be centered on a central longitudinal axis 15. Thrust is produced both by the ambient air accelerated aft by the fan 18 through the fan duct 24 and by exhaust gasses exiting from the engine core 14.

Figure 3:
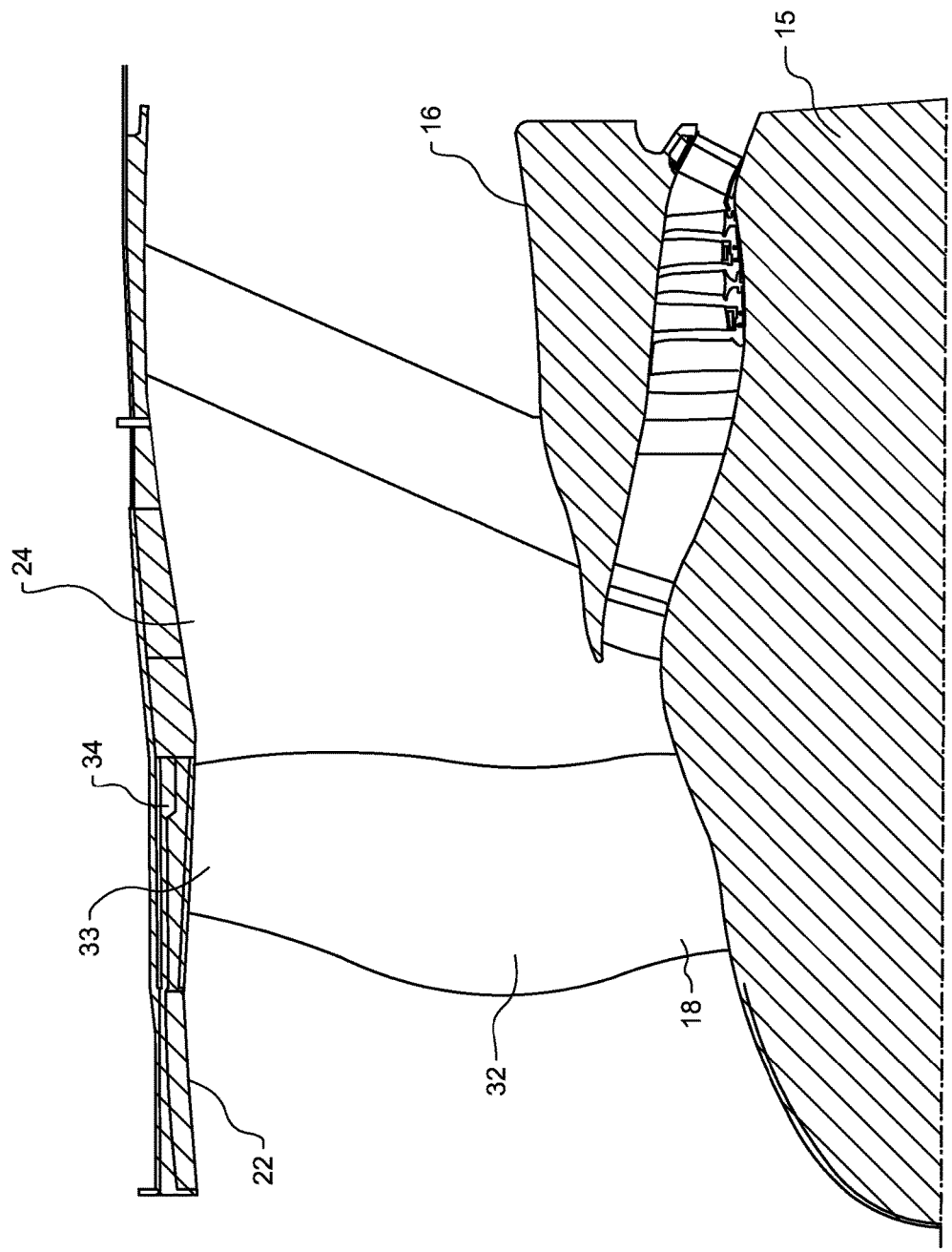
FIG. 3 is a side view of a forward section of a gas turbine engine constructed in accordance with the present disclosure with portions of a nacelle sectioned and broken away to show interior details.

The fan 18 may include a plurality of blades 32 radially extending from the central longitudinal axis 15, as best shown in FIG. 3. Blades 32 are disposed within a fan case 34 and rotate relative thereto in close proximity. More specifically, each blade 32 includes a tip 33 at the blade 32 extreme end, distal to the central longitudinal axis 15. As the fan 18 rotates, each tip 33 will pass at a distance from a point on the fan case 34. Certain distances, or tolerance levels, are desirable for different gas turbine engine 10 performance characteristics. If a desired tolerance level is not achieved, conditions adverse to gas turbine engine 10 efficiency may result, including increased turbulence, internal drag, or flow around the fan 18 rather than through the fan 18. Airflow can even travel upstream around the fan 18, from the fan duct 24 to the atmosphere. Accordingly, it is important to accurately monitor the distance between the tip 33 and the fan case 34 to maintain such tolerances.

Figure 4:
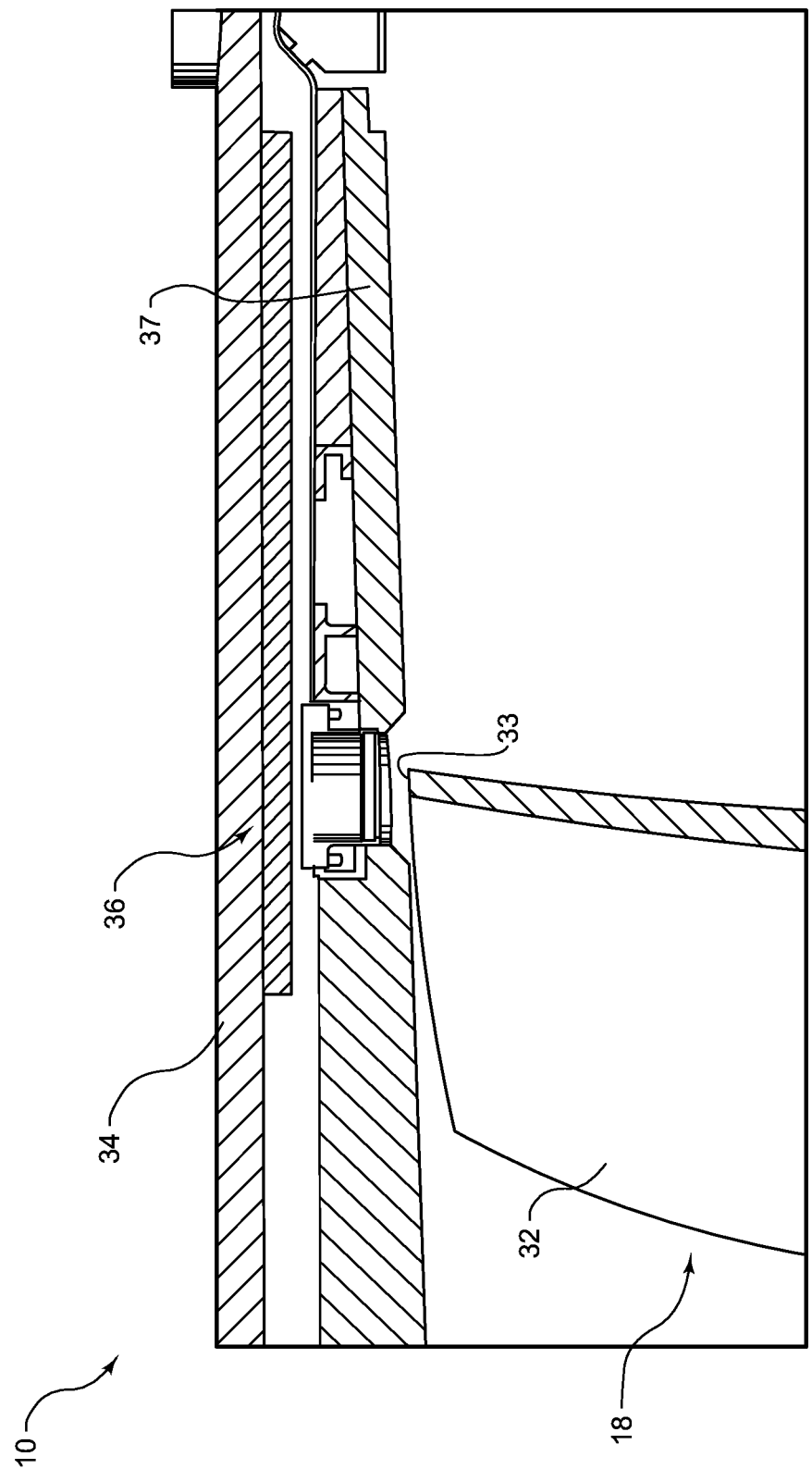
FIG. 4 is an enlarged side view of the forward section of the gas turbine engine of FIG. 3 with portions of a fan case broken away to show details of the present disclosure.

In accordance with the present disclosure, a capacitance probe 36 may be used to monitor the distance between the tip 33 and the fan case 34 or a liner 37 as the fan 18 rotates, as shown in FIG. 4. The capacitance probe 36 may also be described as a gap measuring assembly. As one of ordinary skill in the art will understand, various parts of a gas turbine engine 10 may expand due to the heat generated and absorbed during its operation. In order to accommodate such expansion and contraction while still maintaining desired tolerances, a malleable or thermally conforming liner 37 may be disposed in proximity to the fan case 34, and may form a section of the fan case 34 or exist as an independent part. The liner 37 may expand or contract radially during gas turbine engine 10 operation in response to thermal changes. The blades 32 may also expand in response to thermal changes, and the blades 32 and liner 37 may expand by similar or identical amounts. In this manner, a desired distance between the tip 33 and the liner 37 may be maintained. The liner 37 may be constructed of a synthetic fiber, a para-aramid synthetic fiber, Kevlar®, a composite material, a metal or a polymer. Heat from combustion, friction between gas turbine engine 10 components or direct contact between a blade 32 and the liner 37 may be absorbed into the liner 37, causing it to radially expand.

While using the expandable liner 37 of the present disclosure greatly aids in maintaining the desired tolerance between components, the present disclosure goes further by associating the capacitance probe 36 with the liner 37 in a manner which minimizes space requirements. This inventive contribution is significant as the capacitance probe 36 must do so within the confines of a dynamically changing material while not affecting the overall size envelope of the liner 37 itself. Toward this end, the capacitance probe 36 may be attached directly to the liner 37. The attachment mechanism may include rivets, bolts, screws, adhesives, clips or other methods as explained in more detail below. As the liner 37 expands in response to thermal changes, the attached capacitance probe 36 may travel with the liner 37. In this way, the capacitance probe 36 can record a more accurate distance measurement. The capacitance probe 36 may also detect a distance between other rotating members, including compressor 11 blades or turbine 13 blades, and other static structures, including compressor 11 cases or turbine 13 cases.

More specifically, the capacitance probe 36 may include a circuit board sensor 38, as best shown in FIGS. 5-6. The circuit board sensor 38 may include a plate 40 and one or more capacitors 42. The plate 40 may be made of metal and be encapsulated within an insulating material 44. The insulating material 44 may be a polymer, epoxy, ceramic, metal or other insulating material, and may have electrical, thermal or vibrational insulating properties. Further, the plate 40 may be a metal such as copper, although other materials are certainly possible.

The capacitance probe 36 may further include an annular ring pad 39, a via 41 and a circuit track 43, as best shown in FIG. 6. The annular ring pad 39 may be operatively associated with the plate 40 through the via 41. The circuit track 43 may allow the one or more capacitors 42 to be in electronic communication with the annular ring pad 39.

In addition to accommodating expansion and contraction of the liner 37, the circuit board sensor 38 construction, as described below, allows an easier replacement or modification of the circuit board sensor 38 without damaging the capacitance probe 36. Additionally, it may be possible to adjust the capacitance of the circuit board sensor 38 according to the task at hand by adding, removing or adjusting capacitors 42 on the circuit board sensor 38.

The capacitance probe 36 may be disposed within a housing 46, as shown in FIG. 6, made from a metal, ceramic, polymer or other electrically conductive material. The housing 46 may include provisions for attachment to the liner 37, as indicated above. The capacitance probe 36 may be attached to the liner 37 at a point where the tip 33 passes by as the fan 18 rotates as to better monitor actual tolerances and tip 33 clearance.

In doing so, when the tip 33 passes by the capacitance probe 36 at one distance during one rotation, and then a second distance during a subsequent rotation, the capacitance between the circuit board sensor 38 and tip 33 will change based on the change in distance. This difference in capacitance may then be converted to a voltage and recorded for use in clearance control systems or redesign efforts.

As indicated above, not only does the present disclosure set forth a manner by which blade clearances and other tolerances can be accurately measured, but it does so with minimal increase to the overall footprint of the liner 37. One way in which it does so is using soft leads 48. More specifically, one or more soft leads 48 may be in electrical communication with the circuit board sensor 38 in the capacitance probe 36. The soft leads 48 may be soldered to the capacitors 42, or to another part of the circuit board sensor 38. The soft leads 48 may exist free from any external tubing or routing structure, allowing the soft leads 48 to have a lower weight, reduced size and increased flexibility. The lack of an external structure may also allow for more efficient and compact soft lead 48 routing and egress. The soft leads 48 may also be embedded in the liner 37, and may move with the liner 37 as it thermally expands. The soft leads 48 may carry electronic information from the circuit board sensor 38 to another electronic device. Additionally, the soft leads 48 may further include a capacitance-based temperature compensation system for more accurate distance readings between the tip 33 and the fan case 34.

Figure 7:
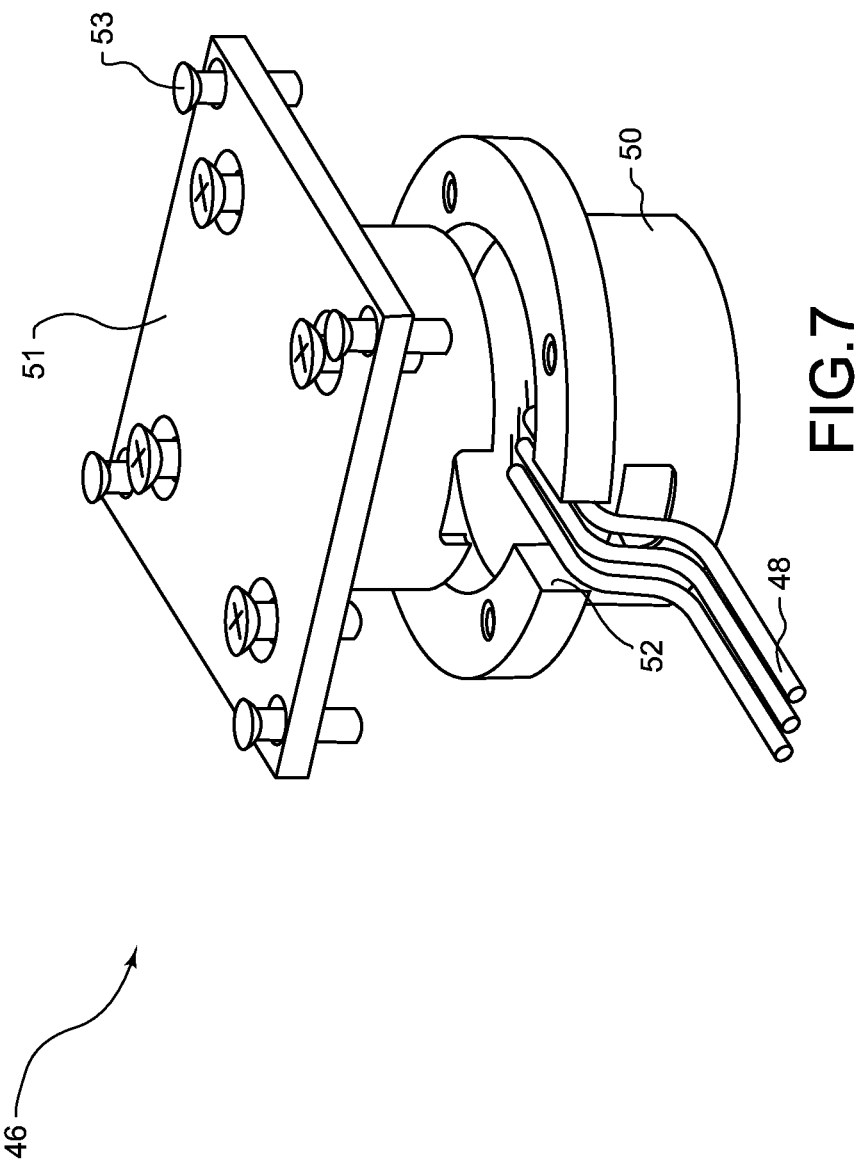
FIG. 7 is a perspective view of a capacitance probe housing constructed in accordance with the present disclosure with portions exploded away to show elements and details.

The capacitance probe 36 may be disposed within the housing 46, as shown in FIG. 7. The housing 46 may include a housing base 50 and a housing cap 51. The housing base 50 may allow the soft leads 48 to pass through, such as by providing a notch 52 or other void therein as shown in FIG. 7. The housing cap 51 may attach to the liner 37 via one or more fasteners 53, such as rivets or through other attachment methods. The housing cap 51 may also attach to the housing base 50.

Figure 8:
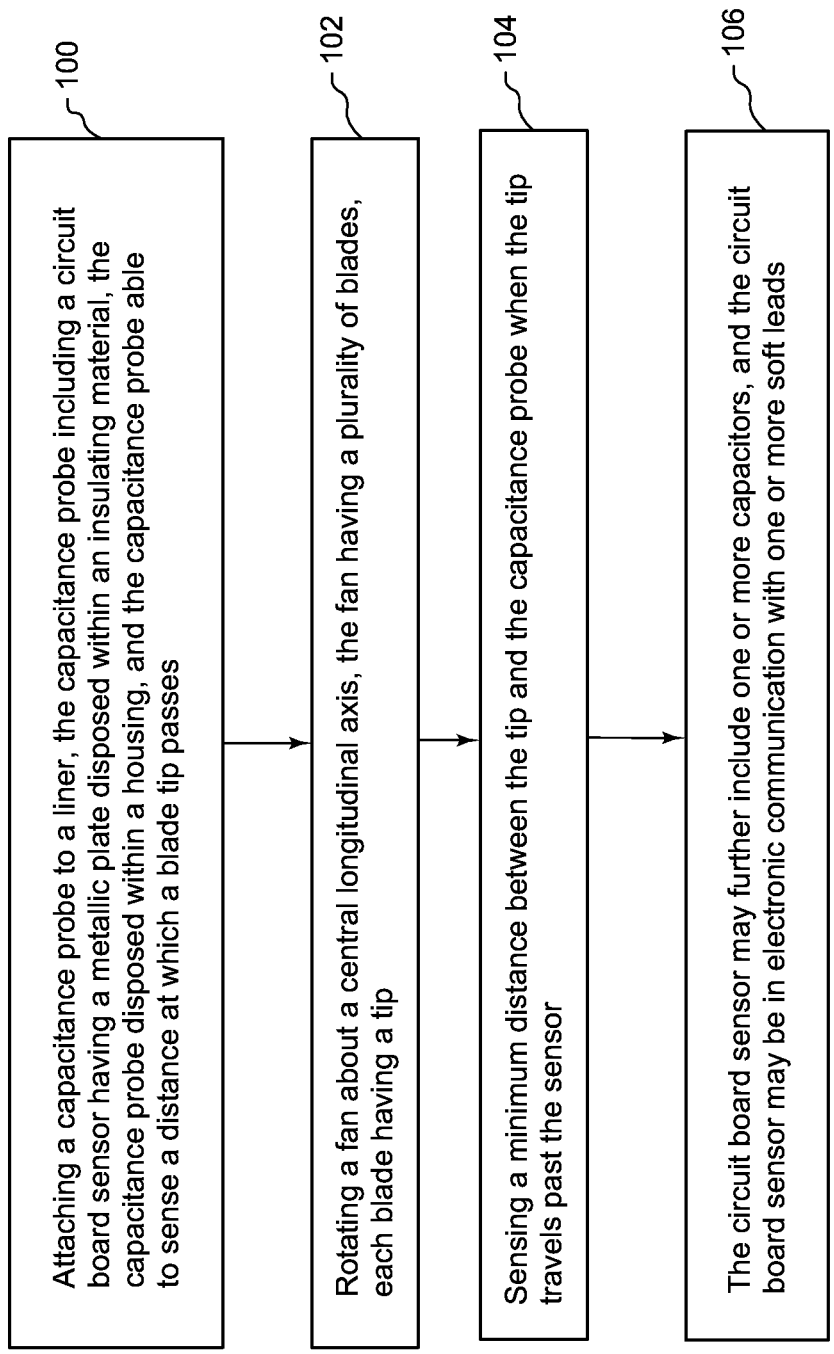
FIG. 8 is a flowchart depicting a sample sequence of steps which may be practiced using the teachings of the present disclosure.

A method for measuring tip clearance relative to a fan case can be understood by referencing the flowchart in FIG. 8. The method may include attaching a capacitance probe to a liner, the capacitance probe including a circuit board sensor having a metallic plate disposed within an insulating material, the capacitance probe disposed within a housing, and the capacitance probe able to sense a distance at which a blade tip passes 100, rotating a fan about a central longitudinal axis, the fan having a plurality of blades, each blade having a tip 102, sensing a minimum distance between the tip and the capacitance probe when the tip travels past the sensor 104, and the circuit board sensor may further include one or more capacitors, and the circuit board sensor may be in electronic communication with one or more soft leads 106.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

In operation, the present disclosure sets forth a capacitance probe 36 system which can find industrial applicability in a variety of settings. For example, the disclosure may be advantageously employed in sensing parameters and characteristics within a gas turbine engine 10. More specifically, the capacitance probe 36 can be used to measure a distance between the tip 33 and the fan case 34 during the operation of the gas turbine engine 10. If a desired tolerance level is not achieved, conditions adverse to gas turbine engine 10 efficiency may result, including increased turbulence, internal drag or flow around the fan 18 rather than through the fan 18. Accordingly, it is important to accurately monitor the distance between the tip 33 and the fan case 34.

The capacitance probe 36 system of the present disclosure may employ soft leads 48 in electronic communication with a circuit board sensor 38 in the capacitance probe 36. The soft leads 48 allow the entire lead apparatus to be smaller, lighter and more flexible.

The capacitance probe 36 may also attach to the liner 37. As the liner 37 expands radially in response to thermal energy generated during operation, the capacitance probe 36 may travel with the liner 37 to increase measurement accuracy.

The capacitance probe 36 system of the present disclosure contributes to a gas turbine engine's 10 continued and efficient operation. The disclosed capacitance probe 36 system may be original equipment on new gas turbine engines 10, or added as a retrofit to existing gas turbine engines 10. While the foregoing has been described as a system for monitoring the distance between the tip 33 and the fan case 34, it can be described with equal accuracy as a gap measuring assembly.

What is claimed is:

1. A fan case assembly for a gas turbine engine, comprising:
    a fan with a fan blade rotatable within a fan case with a liner therein, wherein the liner lines the fan case and is thermally conforming, the liner and the fan blade thermally expand or contract radially and define a gap between the liner and a tip of the fan blade; and
    a gap measuring assembly comprising a capacitance probe mounted to the liner that travels with the liner as the liner expands and or contracts, the capacitance probe being able to sense the gap between the liner and the fan blade tip of the fan blade as the fan blade tip passes relative to the liner;
    the capacitance probe including:
    a circuit board sensor mounted to the liner;
    a housing including an insulating material, and the circuit board sensor including a capacitor and a metallic plate, the metallic plate disposed within the insulating material and in electronic communication with the circuit board sensor;
    a soft lead extending from the housing and being embedded in the liner and being flexible and movable with the liner as the liner thermally expands, the soft lead carries electronic information from the circuit board sensor; and
    the housing having a base and a cap, the base having a notch through which the soft lead passes, the housing connected to the liner so that the circuit board sensor is modifiable without damaging the capacitance probe, including adding, removing or adjusting capacitors on the circuit board sensor.

2. The fan case assembly of claim 1, wherein the capacitance probe includes an annular ring pad in electronic communication with the capacitor and operatively associated with the metallic plate.

3. The fan case assembly of claim 1, wherein the capacitance probe includes plural capacitors and the annular ring pad is in electronic communication with the plural capacitors.

4. The fan case-assembly of claim 1, wherein the liner is able to expand in response to thermal or mechanical changes.

5. The fan case assembly of claim 1, wherein the insulating material for capacitance probe is a polymer.

6. The fan case assembly of claim 1, wherein the insulating material for the capacitance probe is a ceramic.

7. The fan case assembly of claim 1, wherein the housing for the capacitance probe is made from an electrically conductive material.

8. The fan case assembly of claim 4, wherein the gap measuring assembly is able to sense a distance at which the fan blade tip passes relative to the liner.

9. A gas turbine engine, comprising;
    a fan located at an axially forward end of the gas turbine engine and axially forward of a compressor, the fan with a fan blade rotatable within a fan case with a liner therein, wherein the liner lines the fan case and is thermally conforming, the liner and fan thermally expand or contract radially and define a gap between the liner and a tip of the fan blade;
    the compressor located axially forward of a turbine;
    the turbine mechanically connected to the fan and the compressor;
    a gap measuring assembly comprising:
    a capacitance probe mounted to the liner that travels with the liner as the liner expands and or contracts, the capacitance probe being able to sense the gap between the liner and the fan blade tip of the fan blade as the fan blade tip passes relative to the liner;
    the capacitance probe including:
    a circuit board sensor mounted to the liner;
    a housing including an insulating material, and the circuit board sensor including a capacitor and a metallic plate, the metallic plate disposed within the insulating material and in electronic communication with the circuit board sensor;
    a soft lead extending from the housing and being embedded in the liner and being flexible and movable with the liner as the liner thermally expands, the soft lead carries electronic information from the circuit board sensor; and
    the housing having a base and a cap, the base having a notch through which the soft lead passes, the housing connected to the liner so that the circuit board sensor is modifiable without damaging the capacitance probe, including adding, removing or adjusting capacitors on the circuit board sensor.

10. The gas turbine engine of claim 9, wherein the capacitance probe includes an annular ring pad in electronic communication with the capacitor and operatively associated with the metallic plate.

11. The gas turbine engine of claim 9, wherein the capacitance probe includes plural capacitors and the annular ring pad is in electronic communication with the plural capacitors.

12. The gas turbine engine of claim 9, wherein the insulating material is a polymer.

13. The gas turbine engine of claim 9, wherein the insulating material is a ceramic.

14. The gas turbine engine of claim 9, wherein the housing is made from an electrically conductive material.

15. A method for measuring clearance of a fan blade tip, of a fan blade connected to a fan, relative to a liner that lines a fan case of a gas turbine engine, comprising:
    attaching a capacitance probe to the liner, the capacitance probe including:
    a circuit board sensor mounted to the liner;
    a housing including an insulating material, and the circuit board sensor including a capacitor and a metallic plate, the metallic plate disposed within the insulating material and in electronic communication with the circuit board sensor;
a soft lead extending from the housing and being embedded in the liner and movable with the liner as the liner thermally expands, the soft lead carries electronic information from the circuit board sensor; and
the housing having a base and a cap, the base having a notch through which the soft lead passes, the housing connected to the liner so that the circuit board sensor is modifiable without damaging the capacitance probe, including adding, removing or adjusting capacitors on the circuit board sensor;
rotating the fan about a central longitudinal axis; and
sensing a distance between the fan blade tip and the capacitance probe when the fan blade tip travels past the sensor.

* * * * *